(12) United States Patent
Choi et al.

(10) Patent No.: US 10,235,119 B2
(45) Date of Patent: Mar. 19, 2019

(54) DISPLAY CONTROLLING METHOD AND ELECTRONIC DEVICE ADAPTED TO THE SAME

(71) Applicant: Samsung Electronics Co., Ltd., Gyeonggi-do (KR)

(72) Inventors: Seungki Choi, Gyeonggi-do (KR); Seunghoon Lee, Seoul (KR); Kyungjung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 104 days.

(21) Appl. No.: 15/407,976

(22) Filed: Jan. 17, 2017

(65) Prior Publication Data

US 2017/0206049 A1 Jul. 20, 2017

(30) Foreign Application Priority Data

Jan. 14, 2016 (KR) .................. 10-2016-0004783

(51) Int. Cl.
  *G06F 3/14* (2006.01)
  *G06F 1/16* (2006.01)
  (Continued)

(52) U.S. Cl.
  CPC ............ *G06F 3/1423* (2013.01); *G06F 1/166* (2013.01); *G06F 1/1618* (2013.01); *G06F 1/1641* (2013.01); *G06F 1/1647* (2013.01); *G06F 1/1652* (2013.01); *G06F 1/1677* (2013.01); *G06F 1/3215* (2013.01); *G06F 1/3265* (2013.01); *G06F 3/0346* (2013.01); *G06F 2200/1634* (2013.01); *G09G 5/10* (2013.01);
  (Continued)

(58) Field of Classification Search
  CPC .... G06F 1/1618; G06F 1/1641; G06F 1/1647; G06F 1/1652; G06F 1/166; G06F 1/1677; G06F 1/3215; G06F 1/3265; G06F 2200/1634; G06F 3/0346; G06F 3/1423; G09G 2320/0626; G09G 2320/0646; G09G 2330/021; G09G 2360/144
  USPC ......................................... 345/170–176, 156
  See application file for complete search history.

(56) References Cited

U.S. PATENT DOCUMENTS

2004/0036662 A1  2/2004  Sakumura
2014/0062856 A1* 3/2014  Lu ..................... G06F 3/1446
                                                  345/156

(Continued)

FOREIGN PATENT DOCUMENTS

JP    2014036434    2/2014
JP       5665459    2/2015
KR  1020150043806    4/2015

*Primary Examiner* — Tony O Davis
(74) *Attorney, Agent, or Firm* — The Farrell Law Firm, P.C.

(57) ABSTRACT

An electronic device is provided. The electronic device includes a foldable housing. The foldable housing includes a first housing including a first display and an illuminance sensor on a front surface, and a second housing, adjacent to the first housing, including a hole formed through a front surface and a rear surface of the second housing. The front surface of the first housing faces the front surface of the second housing when the second housing is folded in a first direction with respect to the first housing, and a rear surface of the first housing faces the rear surface of the second housing when the second housing is folded in a second direction with respect to the first housing.

15 Claims, 13 Drawing Sheets

(51) Int. Cl.
*G06F 3/0346* (2013.01)
*G06F 1/3215* (2019.01)
*G06F 1/3234* (2019.01)
*G09G 5/10* (2006.01)

(52) U.S. Cl.
CPC ............... *G09G 2320/0626* (2013.01); *G09G 2320/0646* (2013.01); *G09G 2330/021* (2013.01); *G09G 2360/144* (2013.01); *G09G 2380/02* (2013.01)

(56) References Cited

U.S. PATENT DOCUMENTS

| | | | | |
|---|---|---|---|---|
| 2014/0332441 | A1* | 11/2014 | Jayetileke | A45C 11/00 206/774 |
| 2014/0375702 | A1* | 12/2014 | Cho | G06F 1/3265 345/690 |
| 2015/0026623 | A1* | 1/2015 | Horne | G06F 3/04847 715/771 |
| 2015/0070337 | A1* | 3/2015 | Bell | G09G 3/2003 345/207 |
| 2015/0103022 | A1* | 4/2015 | Shim | G06F 3/041 345/173 |
| 2015/0269880 | A1* | 9/2015 | Ge | G09G 3/2003 345/690 |
| 2016/0007441 | A1* | 1/2016 | Matsueda | G06F 1/1652 361/749 |
| 2016/0026381 | A1* | 1/2016 | Kim | G06F 3/04817 715/761 |
| 2016/0109973 | A1* | 4/2016 | Kim | G06F 3/041 345/173 |
| 2016/0162241 | A1* | 6/2016 | An | G06F 3/1423 345/1.3 |
| 2017/0188023 | A1* | 6/2017 | Brabenac | H04N 17/02 |
| 2018/0039410 | A1* | 2/2018 | Kim | G06F 3/04817 |
| 2018/0048359 | A1* | 2/2018 | Kim | H04B 7/0404 |
| 2018/0110139 | A1* | 4/2018 | Seo | H05K 5/0017 |
| 2018/0157361 | A1* | 6/2018 | Kim | G06F 3/0412 |
| 2018/0164852 | A1* | 6/2018 | Lim | G06F 1/1652 |

* cited by examiner

DISPLAY CONTROLLING METHOD AND ELECTRONIC DEVICE ADAPTED TO THE SAME

PRIORITY

The present application claims priority under 35 U.S.C. § 119(a) to a Korean Patent Application filed on Jan. 14, 2016, in the Korean Intellectual Property Office and assigned Ser. No. 10-2016-0004783, the entire disclosure of which is incorporated herein by reference.

BACKGROUND

1. Field of the Disclosure

The present disclosure relates generally to a display controlling method and an electronic device adapted to the method.

2. Description of the Related Art

Various electronic devices are equipped with two or more displays, which are physically separated from each other, to output a screen on each of the displays. Further, in recent years, various electronic devices have been developed to output multiple screens on a single display (e.g., a flexible display) in such a way that the display is functionally split into a corresponding number of screens.

However, prior art methods adjust the brightness of a screen of an electronic device using an illuminance sensor built in the electronic device, without considering whether a screen of the electronic device is covered with a cover or by another screen of the electronic device. As such, when the electronic device is covered with a cover or another screen, the electronic device always considers the device to be in a dark environment regardless of the brightness of the outside environment and, thus, has difficulty controlling the brightness of the screen. This problem may also occur in electronic devices which include a hall sensor or a geomagnetic sensor for detecting the change in magnetic fields when the brightness of the screen is adjusted via the hall sensor or the geomagnetic sensor.

SUMMARY

The present disclosure has been made to address the above-mentioned problems and/or disadvantages, and to provide at least the advantages described below.

Accordingly, an aspect of the present disclosure is to enable an electronic device outputting two or more screens to control the brightness of two or more screens using one illuminance sensor, although one screen covers the other screen.

Accordingly, another aspect of the present disclosure is to enable an electronic device outputting two or more screens to measure an angle between the two or more screens and to control the brightness of the two or more screens, based on the measured angle.

Accordingly, another aspect of the present disclosure is to use at least one sensor in a housing of an electronic device to measure an angle between displays of the electronic device and to provide various functions based on the measured angle.

In accordance with an aspect of the present disclosure, an electronic device is provided. The electronic device includes a foldable housing. The foldable housing includes a first housing including a first display and an illuminance sensor on a front surface, and a second housing, adjacent to the first housing, including a hole formed through a front surface and a rear surface of the second housing. The front surface of the first housing faces the front surface of the second housing when the second housing is folded in a first direction with respect to the first housing, and a rear surface of the first housing faces the rear surface of the second housing when the second housing is folded in a second direction with respect to the first housing.

BRIEF DESCRIPTION OF THE DRAWINGS

The above and other aspects, features, and advantages of the disclosure will be more apparent from the following detailed description, taken in conjunction with the accompanying drawings, in which.

DETAILED DESCRIPTION OF EMBODIMENTS OF THE PRESENT DISCLOSURE

Figure 1:
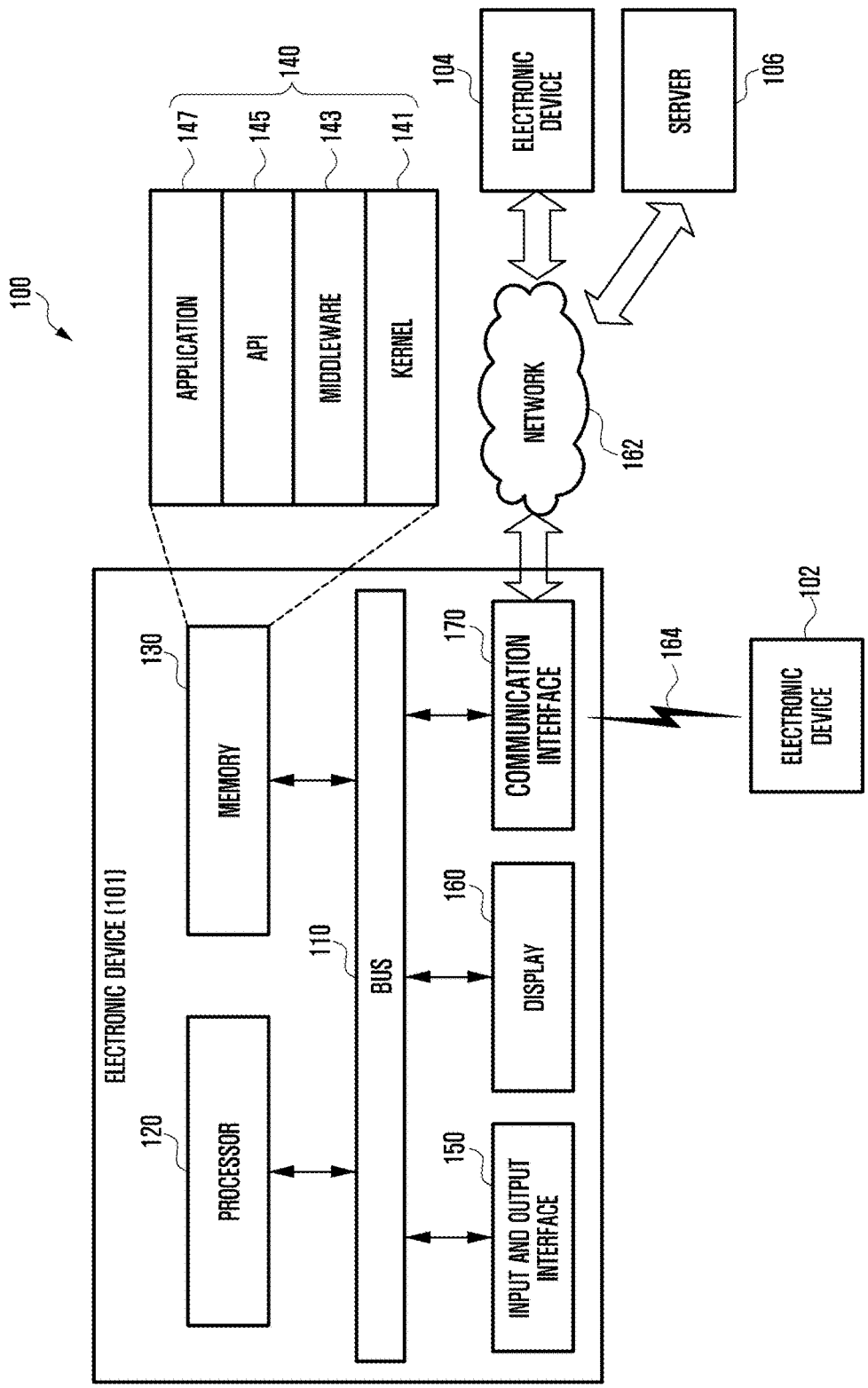
FIG. 1 is a block diagram of a network environment including an electronic device, according to an embodiment of the present disclosure.

Hereinafter, the present disclosure is described in detail with reference to the accompanying drawings. While the present disclosure may be embodied in many different forms, specific embodiments of the present disclosure are shown in the drawings and are described herein in detail, with the understanding that the present disclosure is to be considered illustrative of the principles of the disclosure and is not intended to limit the disclosure to the specific embodiments illustrated. The same reference numbers are used throughout the drawings to refer to the same or like parts.

As used herein, the expression "comprise" indicates the presence of a corresponding function, operation, or element and does not limit additional functions, operations, or elements. Further, the term "have" indicates the presence of a characteristic, numeral, step, operation, element, component, or combination thereof and does not exclude the presence or addition of other characteristics, numerals, steps, operations, elements, components, or a combination thereof.

As used herein, the expression "or" includes any combination or the entire combination of words listed together. For example, "A or B" may include A, B, or both A and B.

The expressions, "first", "second", etc. used herein may modify various elements of the present disclosure, but do not limit the corresponding elements. For example, the above expressions do not limit the order and/or importance of the corresponding elements. The expressions may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure do not limit the present disclosure but describe and illustrate various embodiments. When used in a description of the present disclosure and the appended claims, a singular form includes a plural of form unless it is explicitly differently represented.

Unless differently defined, terms used herein, including technical and a scientific terms, have the same meaning as a meaning that may be generally understood by a person of common skill in the art. It should be understood that generally used terms defined in a dictionary have a meaning corresponding to that of a context of related technology and are not to be interpreted as having an ideal or excessively formal meaning unless explicitly so defined.

An electronic device, according to various embodiments of the present disclosure, may be a device that includes a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a portable medical device, a digital camera, or a wearable device (e.g., a head mounted device (HMD), such as electronic glasses, electronic clothes, an electronic bracelet, an electronic necklace, an electronic appcessory, or a smart watch).

According to some embodiments, an electronic device may be a smart home appliance that includes a communication function. For example, an electronic device may be a television (TV), a digital versatile disk (DVD) player, audio equipment, a refrigerator, an air conditioner, a vacuum cleaner, an oven, a microwave, a washing machine, an air cleaner, a set-top box, a TV box (e.g., Samsung Home-Sync™, Apple TV™, Google TV™, etc.), a game console, an electronic dictionary, an electronic key, a camcorder, or an electronic picture frame.

According to some embodiments, an electronic device may be a medical device (e.g., a magnetic resonance angiography (MRA) device( ), a magnetic resonance imaging (MRI) device, a computed tomography (CT) device, ultrasonography, etc.), a navigation device, a global positioning system (GPS) receiver, an event data recorder (EDR), a flight data recorder (FDR), a car infotainment device, electronic equipment for a ship (e.g., a marine navigation system, a gyrocompass, etc.), an avionics device, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.).

According to some embodiments, the electronic device may be a flexible device.

An electronic device disclosed herein may be one of the above-mentioned devices or any combination thereof. As well understood by those skilled in the art, the above-mentioned electronic devices are provided for illustration purposes only and not to be considered as a limitation of this disclosure.

FIG. 1 is a block diagram of a network environment including an electronic device, according to an embodiment of the present disclosure.

Referring to FIG. 1, a network environment 100, including an electronic device 101 is provided. The electronic device 101 may include a bus 110, a processor 120, a memory 130, an input and output interface 150, a display 160, and a communication interface 170.

The bus 110 may be a circuit for interconnecting elements of the electronic device 101 described above and for allowing a communication, e.g. by transferring a control message, between the elements described above.

The processor 120 can receive commands from the above-mentioned other elements of the electronic device 101, e.g. the memory 130, the input and output interface 150, the display 160, and the communication interface 170, through the bus 110, can decipher the received commands, and perform operations and/or data processing according to the deciphered commands.

The memory 130 can store commands received from the processor 120 and/or other elements of the electronic device 101, e.g. the input and output interface 150, the display 160, and the communication interface 170, and/or commands and/or data generated by the processor 120 and/or other elements of the electronic device 101. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic device 101.

The middleware 143 can perform a relay function which allows the API 145 and/or the application 147 to communicate and exchange data with the kernel 141. Further, in relation to operation requests received from at least one of an application 147, the middleware 143 can perform load balancing in relation to the operation requests by giving a priority in using a system resource, e.g. the bus 110, the processor 120, and/or the memory 130, of the electronic device 101 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The input and output interface 150 can receive a command and/or data from a user, and transfer the received command and/or data to the processor 120 and/or the memory 130 through the bus 110. The display 160 can display an image, a video, and/or data to a user.

The communication interface 170 can establish a communication between the electronic device 101 and an external device, such as first and second external electronic devices 102 and 104 and/or a server 106. For example, the communication interface 170 communicates with the first external electronic device 102 via short-range communication 164 and communicates with the second external electronic device 104 and the server 106, connected to a network 162, via wired or wireless communication.

Wired communication may include a universal serial bus (USB), a high definition multimedia interface (HDMI), recommended standard 232 (RS-232), and plain old telephone service (POTS).

Wireless communication may include long-term evolution (LTE), LTE advance (LTE-A), code division multiple access (CDMA), wideband CDMA (WCDMA), universal mobile telecommunications system (UMTS), wireless broadband (WiBro), or global system for mobile communication (GSM). Wireless communication may also include the short-range communication 164. The short range communication 164 may include WiFi, Bluetooth (BT), and near field communication (NFC).

The network 162 may include a communication network, e.g. the Internet, a local area network (LAN), wire area network (WAN), a telecommunication network, a cellular network, a satellite network, or any other similar and/or suitable communication network.

Each of the external electronic devices 102 and 104 may be the same type and/or different types of electronic devices.

Figure 2:
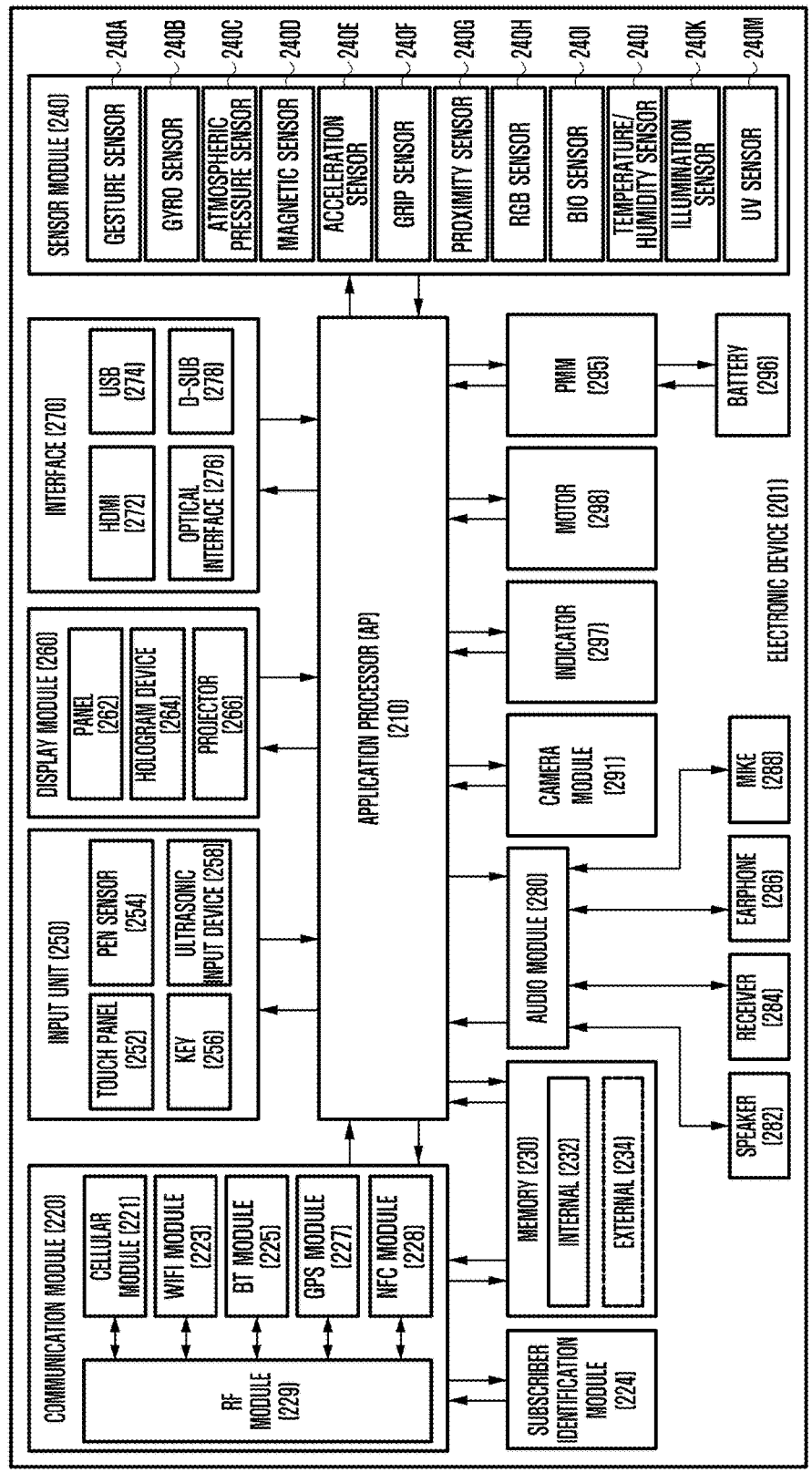
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2 an electronic device 201 is provided. The electronic device 201 may form, for example, the whole or part of the electronic device 101 shown in FIG. 1. The electronic device 201 may include at least one application processor (AP) 210, a communication module 220, a subscriber identification module (SIM) 224, a memory 230, a sensor module 240, an input unit 250, a display module 260, an interface 270, an audio module 280, a camera module 291, a power management module (PMM) 295, a battery 296, an indicator 297, and a motor 298.

The AP 210 may drive an operating system or applications of the electronic device 201, control a plurality of hardware or software components connected thereto, and also perform processing and operation for various data including multi-media data. The AP 210 may be formed of a system-on-chip (SoC). The AP 210 may further include a graphic processing unit (GPU).

The communication module 220 (e.g., the communication interface 160) may perform a data communication with an external electronic device (e.g., the first and second external electronic devices 102 and 104 or the server 106) connected to the electronic device 200 (e.g., the electronic device 101). The communication module 220 may include a cellular module 221, a WiFi module 223, a BT module 225, a GPS module 227, an NFC module 228, and a radio frequency (RF) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device 201 in the communication network, using the SIM 224. The cellular module 221 may perform at least part of functions the AP 210 can provide. For example, the cellular module 221 may perform at least part of a multimedia control function.

The cellular module 221 may include a communication processor (CP). Additionally, the cellular module 221 may be formed of SoC. Although some elements of the electronic device 201, such as the cellular module 221 (e.g., the CP), the memory 230, or the power management module 295, are shown as elements separate from the AP 210, the AP 210 may be formed to have at least part (e.g., the cellular module 221) of the above elements.

The AP 210 or the cellular module 221 (e.g., the CP) may load commands or data, received from a nonvolatile memory connected thereto or from at least one of the other elements of the electronic device 201, into a volatile memory to process the commands or data. Additionally, the AP 210 or the cellular module 221 may store data, received from or created at one or more of the other elements of the electronic device 201, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single integrated circuit (IC) chip or a single IC package. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. The RF module 229 may include a transceiver, a power amp module (PAM), a frequency filter, a low noise amplifier (LNA), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of the modules may perform transmission and reception of RF signals through a separate RF module.

The SIM 224 may be a card including a SIM which may be inserted into a slot of the electronic device 201 and/or an embedded SIM. The SIM 224 may contain therein an integrated circuit card identifier (ICID) or an international mobile subscriber identity (IMSI).

The memory 230 (e.g., the memory 130) may include an internal memory 232 and an external memory 234.

The internal memory 232 may include at least one of a volatile memory (e.g., dynamic random access memory (DRAM), static RAM (SRAM), synchronous DRAM (SDRAM), etc.) and a nonvolatile memory (e.g., one time programmable read-only memory (OTPROM), programmable ROM (PROM), erasable and programmable ROM (EPROM), electrically erasable and programmable (EEPROM), mask ROM, flash ROM, NAND flash memory, NOR flash memory, etc.). The internal memory 232 may have the form of a solid state drive (SSD).

The external memory 234 may include a flash drive, e.g., compact flash (CF), secure digital (SD), micro-SD, mini-SD, extreme digital (xD), memory stick, or the like. The external memory 234 may be functionally connected to the electronic device 201 through various interfaces. The electronic device 201 may further include a storage device or medium such as a hard drive.

The sensor module 240 may measure a physical quantity or sense an operating status of the electronic device 200, and then convert the measured or sensed information into electric signals. The sensor module 240 may include at least one of a gesture sensor 240A, a gyro sensor 240B, an atmospheric sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, an illumination sensor 240K, and a UV (ultraviolet) sensor 240M. Additionally or alternatively, the sensor module 240 may include, e.g., an e-nose sensor, an electromyography (EMG) sensor, an electroencephalogram (EEG) sensor, an electrocardiogram (ECG) sensor, an infrared (IR) sensor, an iris scan sensor, or a finger scan sensor. Also, the sensor module 240 may include a control circuit for controlling one or more sensors equipped therein.

The input unit 250 may include a touch panel 252, a digital pen sensor 254, a key 256, or an ultrasonic input device 258.

The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet.

The key 256 may include a physical button, an optical key, or a keypad.

The ultrasonic input device 258 is capable of identifying data by sensing sound waves with a microphone 288 in the electronic device 201 through an input tool that generates ultrasonic signals, thus allowing wireless recognition.

The electronic device 201 may receive a user input from any external device (e.g., a computer or a server) connected thereto through the communication module 220.

The display 260 (e.g., the display 150) may include a panel 262, a hologram device 264, or a projector 266.

The panel 262 may be liquid crystal display (LCD), active matrix organic LED (AM-OLED), or the like. The panel 262 may have a flexible, transparent or wearable form. The panel 262 may be formed of a single module with the touch panel 252.

The hologram device 264 may display a stereoscopic image in the air using interference of light.

The projector 266 may project an image onto a screen, which may be located at the inside or outside of the electronic device 201.

The display 260 may further include a control circuit for controlling the panel 262, the hologram device 264, and the projector 266.

The interface 270 may include a high-definition multimedia interface (HDMI) 272, a universal serial bus (USB) 274, an optical interface 276, or a d-subminiature (D-sub) 278. The interface 270 may be contained in the communication interface 170 shown in FIG. 1. Additionally or alternatively, the interface 270 may include a mobile high-definition link (MHL) interface, an SD card/multi-media card (MMC) interface, or an infrared data association (IrDA) interface.

The audio module 280 may perform a conversion between sounds and electric signals. At least part of the audio module 280 may be contained in the input and output interface 150 shown in FIG. 1. The audio module 280 may process sound information inputted or outputted through a speaker 282, a receiver 284, an earphone 286, or the microphone 288.

The camera module 291 is a device capable of obtaining still images and moving images. The camera module 291 may include at least one image sensor (e.g., a front sensor or a rear sensor), a lens, an image signal processor (ISP), or a flash (e.g., LED or xenon lamp).

The power management module 295 may manage electric power of the electronic device 201. The power management module 295 may include, for example, a power management integrated circuit (PMIC), a charger IC, or a battery gauge.

The PMIC may be formed of an IC chip or SoC. Charging may be performed in a wired or wireless manner. The charger IC may charge a battery 296 and prevent overvoltage or overcurrent from a charger. The charger IC may have a charger IC used for at least one of wired and wireless charging types. A wireless charging type may include a magnetic resonance type, a magnetic induction type, or an electromagnetic type. An additional circuit for a wireless charging may be further used such as a coil loop, a resonance circuit, or a rectifier.

The battery gauge may measure a residual amount, and a voltage, current, or temperature of the battery 296.

The battery 296 may store or create electric power therein and supply electric power to the electronic device 201. The battery 296 may be a rechargeable battery or a solar battery.

The indicator 297 may show thereon a current status (e.g., a booting status, a message status, or a recharging status) of the electronic device 201 or it's a part of the electronic device 201 (e.g., the AP 210).

The motor 298 may convert an electric signal into a mechanical vibration. The electronic device 201 may include a specific processor (e.g., a GPU) for supporting a mobile TV. This processor may process media data that complies with standards of digital multimedia broadcasting (DMB), digital video broadcasting (DVB), or media flow.

Each of the above-discussed elements of the electronic device 201 may be formed of one or more components, and its name may be varied according to the type of the electronic device. The electronic device 201 may be formed of at least one of the above-discussed elements without some elements or with additional elements. Some of the elements of the electronic device 201 may be integrated into a single entity that performs the same functions as those of such elements before being integrated.

The term "module" used in this disclosure may refer to a certain unit that includes one of hardware, software, firmware, or any combination thereof. The term "module" may be interchangeably used with the terms "unit", "logic", "logical block", "component", or "circuit". The module may be the minimum unit, or part thereof, which performs one or more particular functions. The module may be formed mechanically or electronically. For example, the module disclosed herein may include at least one of an application-specific integrated circuit (ASIC) chip, a field-programmable gate array (FPGA), and a programmable-logic device, which have been known or are to be developed in the future.

The operations performed by modules or the other components, may be executed in serial, parallel, repetitive or heuristic fashion. Part of the operations can be executed in any other order, skipped, or executed with additional operations.

Figure 3:
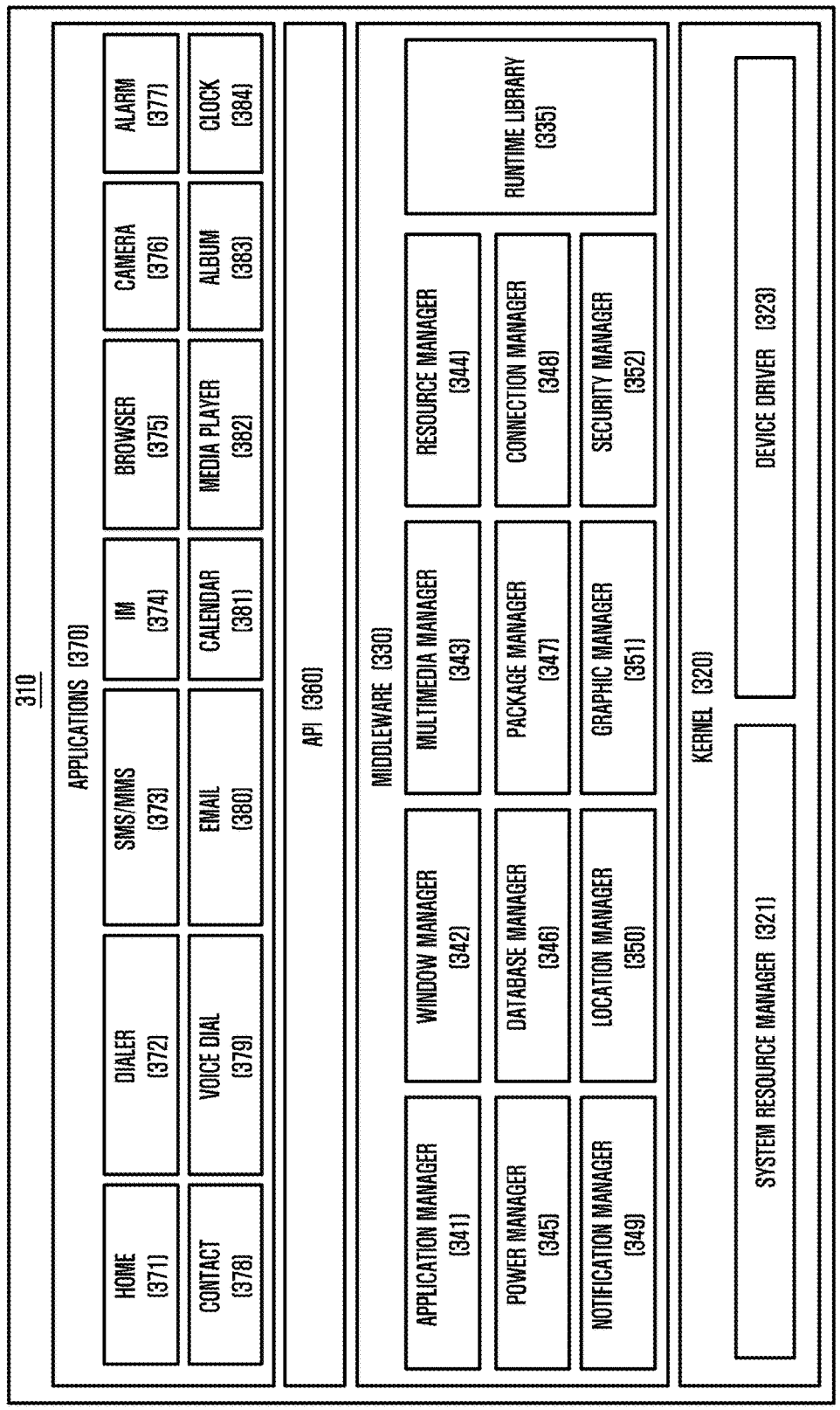
FIG. 3 is a block diagram of a program module, according to an embodiment of the present disclosure.

FIG. 3 is a block diagram of a program module, according to an embodiment of the present disclosure.

Referring to FIG. 3, a programming module 310 of the electronic device 101 is provided. The programming module 310 may be stored in the memory 130 of the electronic device 101. At least a part of the programming module 300 may be implemented in software, firmware, hardware, or a combination of two or more thereof. The programming module 300 may be implemented in hardware, and may include an OS controlling resources related to the electronic device 101 and/or various applications 370 executed in the OS. For example, the OS may be Android™, iOS™, Windows™, Symbian™, Tizen™, Bada™, and the like.

The programming module 310 may include a kernel 320, a middleware 330, an API 360, and/or the applications 370.

The kernel 320 (e.g., the kernel 131) may include a system resource manager 321 and/or a device driver 323.

The system resource manager 321 may include a process manager, a memory manager, and a file system manager. The system resource manager 321 may perform the control, allocation, recovery, and/or the like of system resources.

The device driver 323 may include a display driver, a camera driver, a Bluetooth driver, a shared memory driver, a USB driver, a keypad driver, a WiFi driver, and/or an audio driver. Also, the device driver 323 may include an inter-process communication (IPC) driver.

The middleware 330 (e.g., the middleware 132) may include multiple modules previously implemented so as to provide a function used in common by the applications 370. Also, the middleware 330 may provide a function to the applications 370 through the API 360 in order to enable the applications 370 to efficiently use limited system resources within the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include a library module used by a complier, in order to add a new function by using a programming language during the execution of the application 370. The runtime library 335 may perform functions which are related to input and output, the management of a memory, an arithmetic function, and/or the like.

The application manager 341 may manage a life cycle of at least one of the applications 370.

The window manager 342 may manage GUI resources used on a screen of the electronic device 101.

The multimedia manager 343 may detect a format used to reproduce various media files and may encode or decode a media file through a codec appropriate for the relevant format.

The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation.

The database manager 346 may manage a database in such a manner as to enable the generation, search and/or change of the database to be used by at least one of the applications 370.

The package manager 347 may manage the installation and/or update of an application distributed in the form of a package file.

The connectivity manager 348 may manage a wireless connectivity such as WiFi and Bluetooth.

The notification manager 349 may display or report, to the user, an event such as an arrival message, an appointment, a proximity alarm, and the like in such a manner as not to disturb the user.

The location manager 350 may manage location information of the electronic device 101.

The graphic manager 351 may manage a graphic effect, which is to be provided to the user, and/or a user interface related to the graphic effect.

The security manager 352 may provide various security functions used for system security, user authentication, and the like.

When the electronic device 101 has a telephone function, the middleware 330 may further include a telephony manager for managing a voice telephony call function and/or a video telephony call function of the electronic device.

The middleware 330 may generate and use a new middleware module through various functional combinations of the above-described modules. The middleware 330 may provide modules specialized according to types of OSs in order to provide differentiated functions. Also, the middleware 330 may dynamically delete some of the existing elements, or may add new elements. Accordingly, the middleware 330 may omit some of the above-described elements, may further include other elements, or may replace some of the elements with other elements, each of which performs a similar function and has a different name.

The API 360 (e.g., the API 133) is a set of API programming functions, and may be provided with a different configuration according to an OS. In the case of Android™ or iOS™ one API set may be provided to each platform. In the case of Tizen™ two or more API sets may be provided to each platform.

The applications 370 (e.g., the applications 134) may include a preloaded application and/or a third party application. The applications 370 may include a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors, e.g., the processor 120), the one or more processors may perform functions corresponding to the instructions. The non-transitory computer-readable storage medium may be the memory 130. At least a part of the programming module 310 may be implemented by the processor 120. At least a part of the programming module 310 may include a module, a program, a routine, a set of instructions, and/or a process for performing one or more functions. Examples of computer-readable media include magnetic media, such as hard disks, floppy disks, and magnetic tape; optical media, such as compact disc-ROM (CD-ROM) disks, and DVDs; magneto-optical media, such as floptical disks; and hardware devices that are specially configured to store and perform program instructions (e.g., programming modules), such as ROM, RAM, flash memory, etc. The instructions may include machine code instructions created by assembly languages, such as a compiler, and code instructions created by a high-level programming language executable in computers using an interpreter, etc.

The programming module 310 may include one or more of the above-described, components, may exclude some components, or may include new components.

Figure 4:
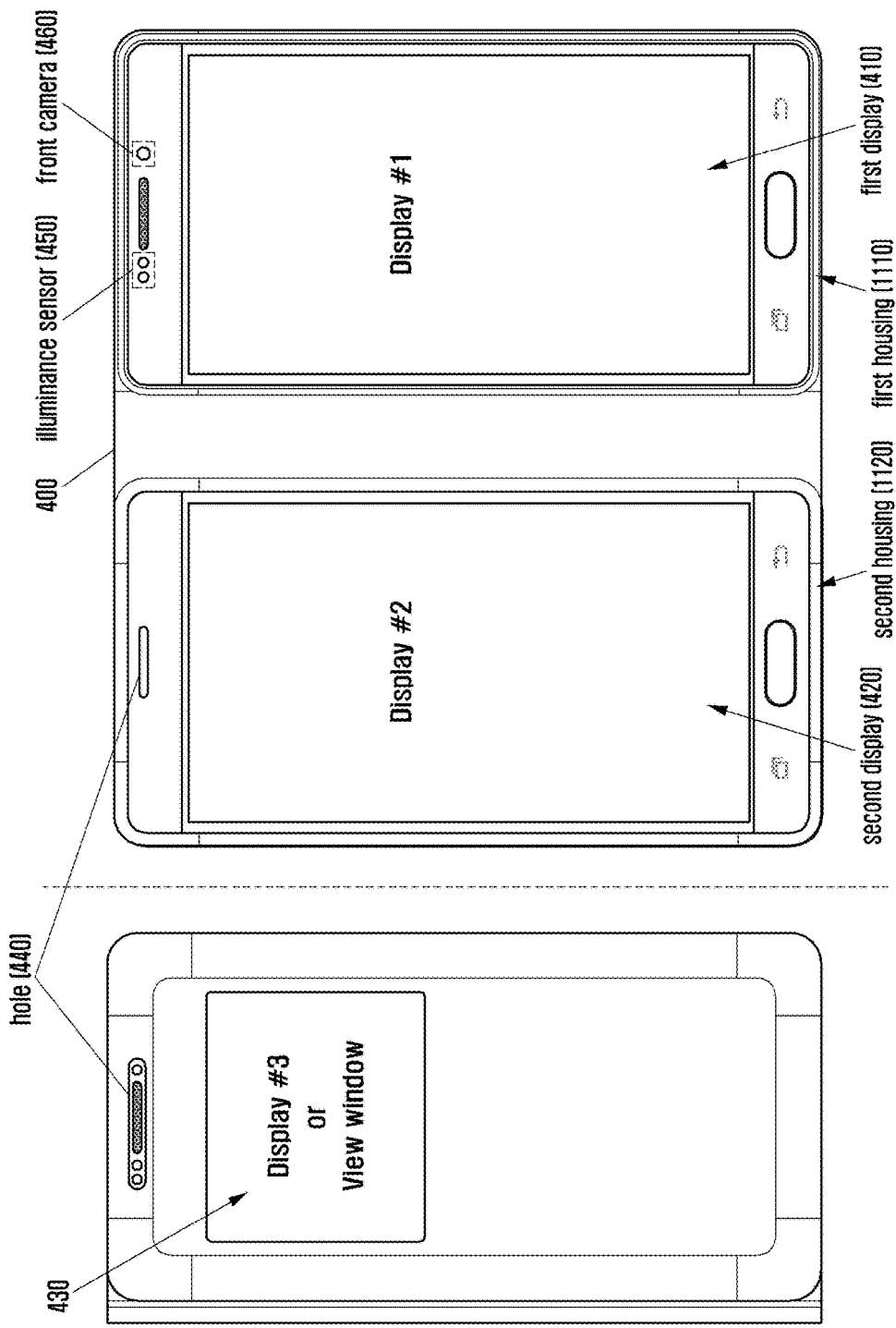
FIG. 4 illustrates an electronic device when it is in open and closed states, according to an embodiment of the present disclosure.

FIG. 4 illustrates an electronic device when it is in open and closed states, according to an embodiment of the present disclosure.

Referring to FIG. 4, an electronic device 400 is shown. The electronic device 400 is capable of outputting two or more screens. The two or more screens may be displayed via two or more displays (e.g., dual displays), such as a first display 410 and a second display 420. Alternatively, the two or more screens may be displayed via one display (e.g., a flexible display) in such a way that the display is split into a corresponding number of screens. The two or more screens of the electronic device 400 may be folded, facing each other. The electronic device 400 may be implemented in such a way as to further include displays on the back of at least one of the two or more screens, thereby outputting a total of three or four screens.

The electronic device 400 may be in an open or closed state. When the electronic device 400 is in an open state, the first display 410 and the second display 420 are located apart from each other. For example, an open state may be defined as a case where the angle between the first display 410 and the second display 420 is greater than 0°. Alternatively, an open state may be defined as a condition as to whether the angle between the first display 410 and the second display 420 is greater than a preset angle, e.g., 5°.

The electronic device 400 may be implemented in such a way that the first display 410 includes an illuminance sensor 450 and a camera module 460. The electronic device 400 is capable of measuring its ambient illuminance via the illuminance sensor 450 and adjusting the brightness of the screen corresponding to the measured illuminance.

The electronic device 400 may be designed in such a way that the first display 410 and the second display 420 meet in a closed state. In another embodiment, the electronic device 400 may be designed in such a way that a first housing 1110 including the first display 410 and a second housing 1120 including the second display 420 meet in a closed state. For example, a closed state may be defined as a case where the angle between the first display 410 and the second display 420 is 0°. Alternatively, a closed state may be defined as a condition as to whether the angle between the first display 410 and the second display 420 is less than a preset angle, e.g., 1°.

When the electronic device 400 is in a closed state, an optional area 430 of a display may be arranged on the front side. For example, the optional area 430 may include a third display and output an independent screen. Alternatively, the optional area 430 may include a view window through which a screen output from the first display 410 is displayed. The view window may be made of a material with high light transmittance in order to increase visibility. Alternatively, the view window may be formed as an open area.

The electronic device 400 may include a hole 440 on the body of the electronic device 400. The hole 440 may be formed in the second display 420 or in a second housing 1120 including the second display 420. The hole 440 of the electronic device 400 provides the illuminance sensor 450 with assistance to measure illuminance near the electronic device 400.

When the electronic device 400 is designed without the hole 440 and is in a closed state, the electronic device 400 has difficulty measuring the ambient illuminance via the illuminance sensor 450 since the illuminance sensor is covered. As a result, when the optional area 430 includes a third display, and the electronic device 400 is in a closed state causing the illuminance sensor 450 to be covered, the electronic device 400 may not adjust the brightness of the third display. When another illuminance sensor is installed on the same side of the electronic device 400 as the third display to resolve this problem, manufacturing costs increase. The present disclosure solves this problem by using the hole 440 of the electronic device 400 to enable the electronic device 400, when in a closed state, to control the brightness of the third display by using a single illuminance sensor 450.

Figure 5:
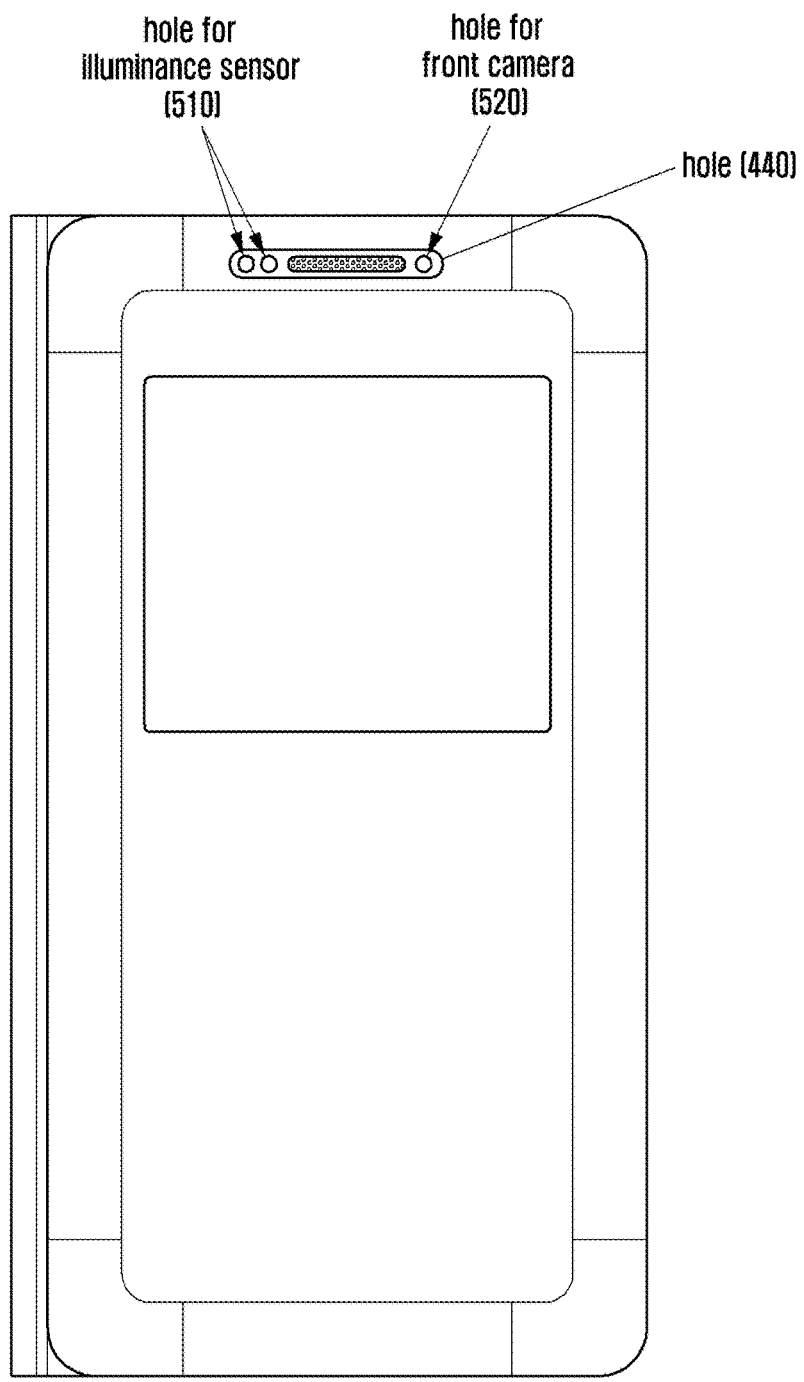
FIG. 5 illustrates the disposition of a hole in an electronic device when the electronic device is in a closed state, according to an embodiment of the present disclosure.

FIG. 5 illustrates the disposition of a hole in an electronic device when the electronic device is in a closed state, according to an embodiment of the present disclosure.

Referring to FIG. 5, the electronic device 400, including the hole 440, is shown. The hole 440 includes a hole 510 for the illuminance sensor 450 and a hole 520 for the camera module 460. Accordingly, even when the second housing 1120 is covered, the illuminance sensor 450 is capable of measuring illuminance near the electronic device 400 through the hole 440, so that the electronic device 400 can control brightness of the third display, based on the measured illuminance.

Figure 6:
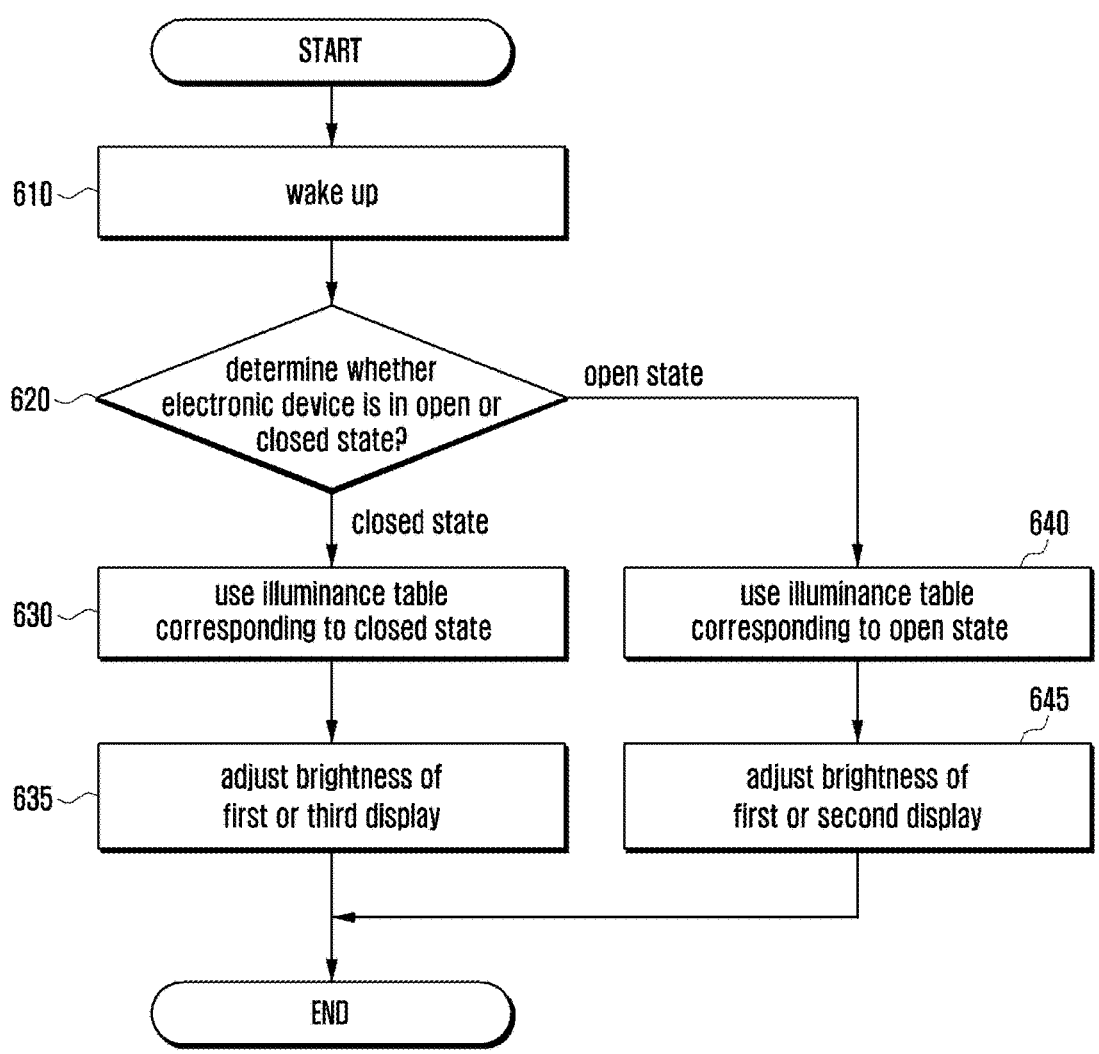
FIG. 6 is a flowchart of a method for controlling brightness of a display in an electronic device when the electronic device is in an open or closed state, according to an embodiment of the present disclosure.

FIG. 6 is a flowchart of a method for controlling brightness of a display in an electronic device when the electronic device is in an open or closed state, according to an embodiment of the present disclosure.

Referring to FIG. 6, the electronic device 400 receives a wake-up signal in step 610. Examples of the wake-up signal are a user's input signal, an external signal received via the communication module 220, and a signal created by an application of the electronic device 400. The electronic device 400 is capable of changing at least one screen from an off state to an on state according to the received wake-up signal. When the electronic device 400 is in a wake-up state, it proceeds with step 620.

The electronic device 400 determines whether it is in an open state or a closed state in step 620. When the electronic device 400 is in a closed, it proceeds with step 630. When the electronic device 400 is in an open state, it proceeds with step 640.

The electronic device 400 loads an illuminance table corresponding to a closed state in step 630. The illuminance table stores correlation data for setting a brightness of the display corresponding to an illuminance value detected by the illuminance sensor 450. For example, when the electronic device 400 is in a closed state, the illuminance sensor 450 may measure an illuminance value which differs from that in an open state, and the difference may be because the hole 440 is shaded or otherwise covered. Therefore, the electronic device 400 is capable of loading an illuminance table for a closed state, considering factors (conditions) influencing illuminance values measured by the illuminance sensor 450.

The electronic device 400 is capable of controlling the brightness of the first display 410 or third display, using an illuminance table corresponding to a closed state in step 635. For example, when a view window is located in the optional area 430, the electronic device 400 is capable of adjusting the brightness of the first display 410. Alternatively, when the third display is located in the optional area 430, the electronic device 400 is capable of adjusting the brightness of the third display.

When the electronic device 400 is in an open state, the electronic device 400 is capable of loading an illuminance table corresponding to the open state in step 640. In particular, the electronic device 400 is capable of using illuminance tables which differ from each other, corresponding to angles between the first display 410 and the second display 420, in an open state. For example, when the electronic device 400 is in an open state where the first display 410 and the second display 420 are open at an angle of 180°, the electronic device 400 may employ a conventional illuminance table because the illuminance sensor 450 is not covered. However, when the electronic device 400 has an angle between the first display 410 and the second display 420 which may affect the measurement of illuminance by the illuminance sensor 450, the electronic device 400 may employ an illuminance table corresponding to the angle.

The electronic device 400 is capable of controlling the brightness of the first and second displays 410 and 420 using an illuminance table corresponding to an open state in step 645. In particular, the electronic device 400 is capable of controlling the brightness of the first and second displays 410 and 420 using an illuminance table corresponding to an angle between the first and second displays 410 and 420, in an open state. The electronic device 400 is also capable of controlling the brightness of the third display in an open state.

Figure 7:
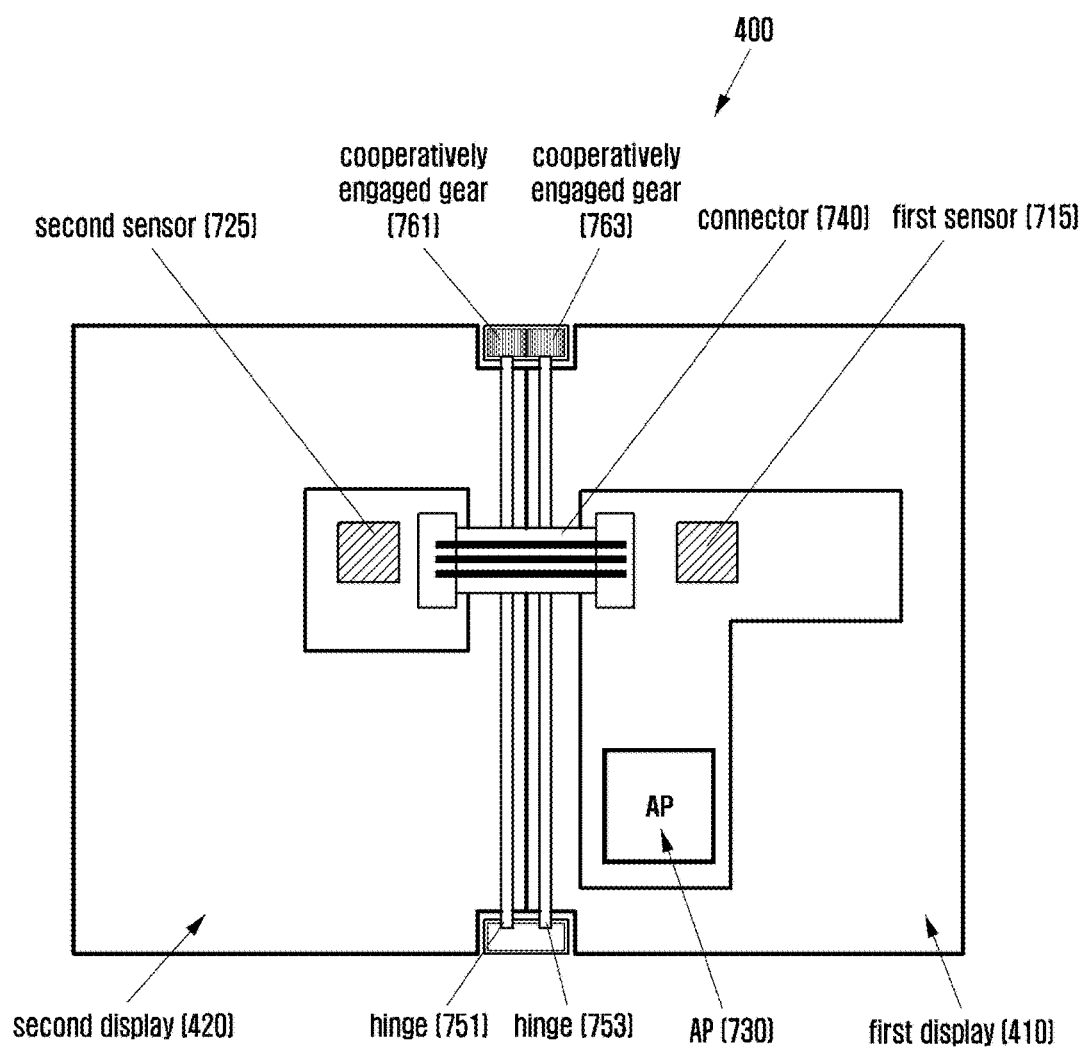
FIG. 7 illustrates a link structure of components of an electronic device for measuring an angle, according to an embodiment of the present disclosure.

FIG. 7 illustrates a link structure of components of an electronic device for measuring an angle, according to an embodiment of the present disclosure.

Referring to FIG. 7, the electronic device 400 is shown. The electronic device 400 includes the first display 410, the second display 420, a connector 740, hinges 751 and 753, and a pair of cooperatively engaged gears 761 and 763. The first display 410 includes a first sensor 715 and an AP 730. The second display 420 includes a second sensor 725. The first display 410 and the second display 420 may be implemented as individual displays which are physically separated from each other. Alternatively, the first display 410 and the second display 420 may be implemented as a single display (e.g., a flexible display) which is functionally divided into two displays.

Each of the first sensor 715 and the second sensor 725 is implemented with a six-axis sensor. A combination of a three-axis acceleration sensor and a three-axis gyroscope sensor is referred to as a six-axis sensor. The first sensor 715 and the second sensor 725 may also be implemented with at least one of a geomagnetic sensor, a hall sensor, a proximity sensor, and an illuminance sensor. The first sensor 715 and the second sensor 725 are capable of measuring an angle between the first display 410 and the second display 420. For example, the geomagnetic sensor or the hall sensor is used to detect the magnetic material attached to the first display 410 or the second display 420, and provides data to measure an angle between the first display 410 and the second display 420. The proximity sensor or the illuminance sensor is used to detect the proximity of the first display 410 and the second display 420, and provides data to measure an angle between the first display 410 and the second display 420.

The first sensor 715 and the second sensor 725 are connected to each other via the connector 740. The connector 740 is implemented with a flexible printed circuit board (FPCB) which can be flexibly bent when the first display 410 and the second display 420 are folded.

The first sensor 715 and the second sensor 725 are also connected to each other via the communication module 220. For example, the first sensor 715 and the second sensor 725 are capable of transmitting/receiving communication signals (e.g., RF signals) to/from each other, using at least one of the following the RF module 229, the cellular module 221, the WiFi module 223, the Bluetooth module 225, and the NFC module 228.

The AP 730 is capable of measuring an angle between the first display 410 and the second display 420, using sensor data obtained by the first sensor 715 and the second sensor 725.

The electronic device 400 is capable of obtaining an angle, using a mechanical method. The electronic device 400 is capable of detecting a change in the hinges 751 and 753 or a movement of a cover, and obtaining an angle based on the detected result. For example, the hinges 751 and 753 of the electronic device 400 are connected to each other via the pair of cooperatively engaged gears 761 and 763. In this case, the two hinges 751 and 753 are synchronously rotated. Each of the hinges 751 and 753 of the electronic device 400 has a locking groove formed therein. The hinges 751 and 753 are fixed at an angle via the locking grooves. When the hinges 751 and 753 are fixed at an angle, the electronic device 400 is capable of detecting the angle between the first display 410 and the second display 420, which are related to the hinges 751 and 753 respectively. For example, the angle between the first display 410 and the second display 420 may be a range of 0~180° according to the fixed positions of the hinges 751 and 753. It should be understood that the hinges 751 and 753 and the pair of cooperatively engaged gears 761 and 763 are optional components to mechanically measure an angle between the first display 410 and the second display 420, and thus may omitted from the electronic device 400 according to modifications of the present disclosure.

Figure 8:
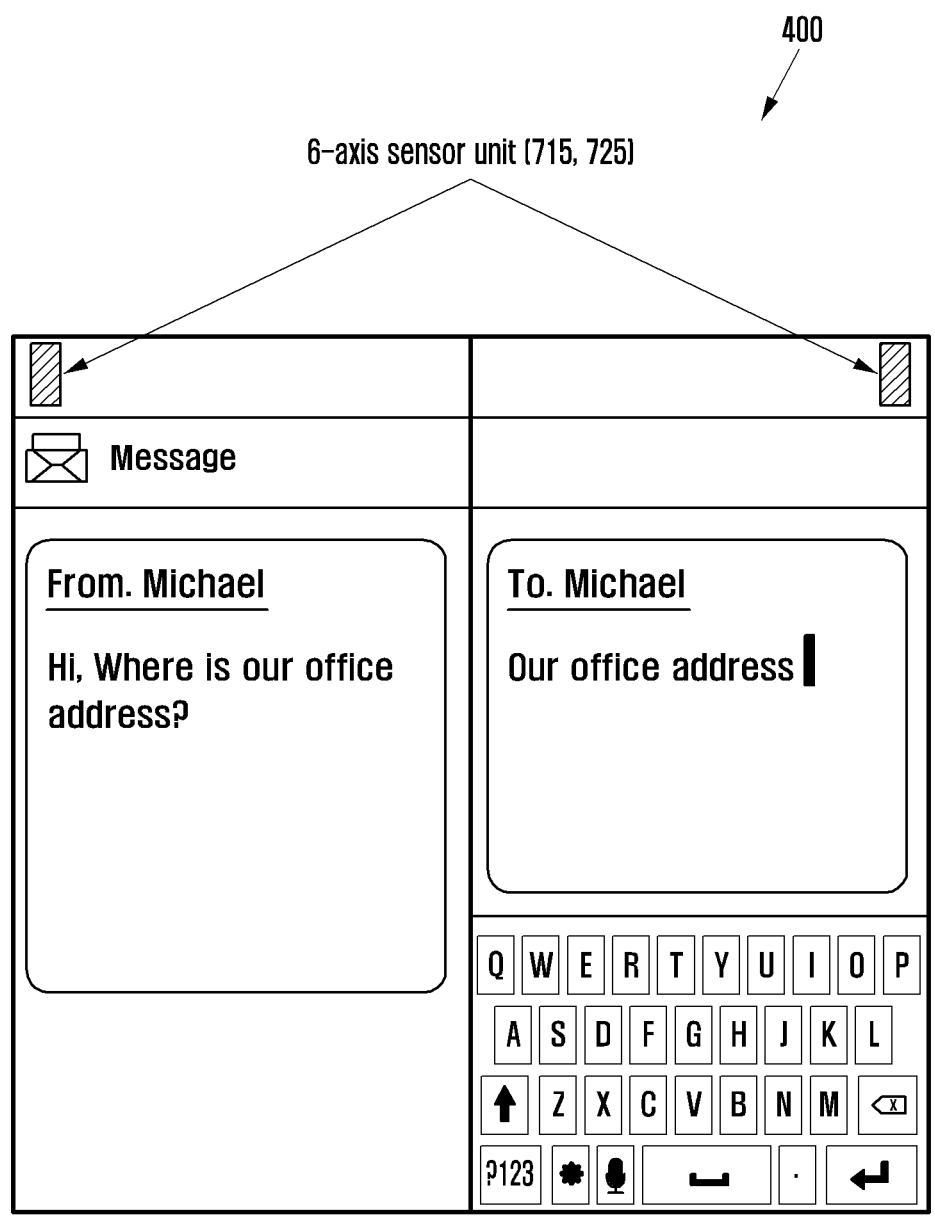
FIG. 8 illustrates an arrangement of sensors of an electronic device for measuring an angle, according to an embodiment of the present disclosure.

FIG. 8 illustrates an arrangement of sensors of an electronic device for measuring an angle, according to an embodiment of the present disclosure.

Referring to FIG. 8, the electronic device 400, including the first sensor 715 and the second sensor 725, is shown in an open state. Each of the first sensor 715 and the second sensor 725 is implemented with a six-axis sensor. The first sensor 715 and the second sensor 725 are disposed at the edges of the first display 410 and the second display 420, respectively. The first sensor 715 detects the movement of the first display 410, and the second sensor 725 detects the movement of the second display 420.

Figure 9:
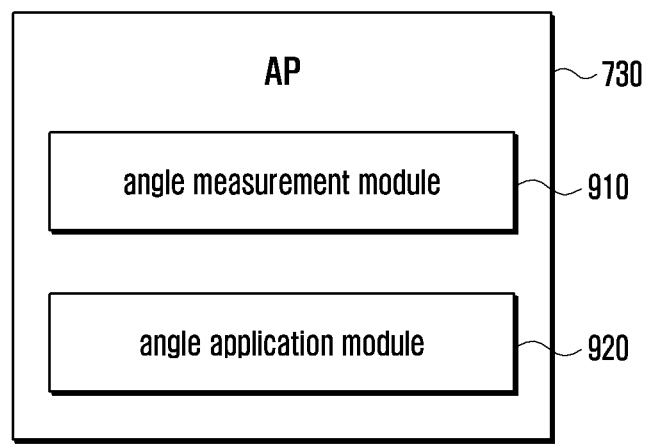
FIG. 9 is a block diagram of an application processor of an electronic device, according to an embodiment of the present disclosure.

FIG. 9 is a block diagram of an application processor of an electronic device, according to an embodiment of the present disclosure.

Referring to FIG. 9, the AP 730 is provided. The AP 730 includes an angle measurement module 910 and an angle application module 920.

The AP 730 is capable of measuring an angle between the first display 410 and the second display 420, using sensor data collected from the first sensor 715 and the second sensor 725. The AP 730 is capable of providing the user with various functions, by applying the measured angle to the electronic device.

The angle measurement module 910 is capable of measuring an angle between the first display 410 and the second display 420, using an acceleration sensor.

When an angle between the first display 410 and/or the second display 420 and the ground is less than or equal to a preset angle (e.g., 10°), the angle measurement module 910 is capable of measuring an angle between the first display 410 and the second display 420, using an acceleration sensor.

When an angle between the first display 410 and/or the second display 420 and the ground is greater than 10°, the accuracy of the angle measured by the acceleration sensor may decrease. That is, when an angle between the first display 410 and/or the second display 420 and the ground is greater than 10°, the variation in the Z-axis of the acceleration sensor does not vary due to the acceleration of gravity; however, the variations in the X- and Y-axes of the acceleration sensor decrease. Therefore, the electronic device 400 has difficulty accurately measuring a variation of an angle between the first display 410 and the second display 420, only using an acceleration sensor. Although 10° is used as the value of the reference angle for comparing an angle between the first display 410 and the second display 420, it should be understood that the reference angle may be set to any value if it can be meaningful to measure an accurate angle.

The angle measurement module 910 is capable of obtaining acceleration sensor data from the first sensor 715 installed to the first display 410 and the second sensor 725 installed to the second display 420. The acceleration sensor data from the first sensor 715 is defined as the first acceleration sensor data (x1, y1, z1). The acceleration sensor data from the second sensor 725 is defined as the second acceleration sensor data (x2, y2, z2).

The angle measurement module 910 is capable of calculating the magnitude of acceleration sensor data, m, using the acceleration sensor data. For example, the angle measurement module 910 is capable of calculating the magnitudes of the first acceleration sensor data and the second acceleration sensor data, respectively, using Equation (1).

$$m=\sqrt{x^2+y^2+z^2} \qquad \text{Equation (1)}$$

The angle measurement module 910 is capable of obtaining an angle between first and second displays 410 and 420 and the ground, using the magnitudes of acceleration sensor data and the acceleration sensor data of the acceleration sensors 715 and 725, respectively. For example, the angle measurement module 910 is capable of measuring angles between the first display 410 and the ground and between the second display 420 and the ground, using Equation (2), shown below, and then obtaining an angle between the first display 410 and the second display 420, based on the angles measured in relation to the ground.

$$\text{Angle}=(\sin^{-1} x\text{-axis component/magnitude})\times 180/\pi \qquad \text{Equation (2)}$$

The angle measurement module 910 is capable of measuring an angle between the first display 410 and the second display 420, using quaternion vectors.

When an angle between each of the first display 410 and the second display 420 and the ground is greater than a preset angle (e.g., 10°), the angle measurement module 910 is capable of measuring an angle between the first display 410 and the second display 420, using quaternion vectors.

The quaternion may be defined as a four-dimensional vector extended by adding j and k terms to a complex number in the two-dimensional of a real part and a complex part, a+bi. That is, the complex number expressed in a two-dimensional, a+bi, extends to a three dimensional form, a+ib+jc, by including an imaginary unit j, and to a four-dimensional form, a+ib+jc+kd, by further including an imaginary unit k.

The angle measurement module 910 is capable of obtaining quaternion vectors a1, b1, c1, and d1 of the first display 410 and quaternion vectors a2, b2, c2, and d2 of the second display 420, using data from the sensors 715 and 725, respectively.

The angle measurement module 910 is capable of applying the dot product to the unit vectors of quaternion vectors of the first display 410 and the second display 420, as in Equation (3).

$$\vec{A}\cdot\vec{B}=|\vec{A}||\vec{B}|\cos\theta \qquad \text{Equation (3)}$$

The angle measurement module 910 is capable of obtaining an angle between the first display 410 and the second display 420, using Equation (4). The obtained angle is a result of the dot product, and thus has a range of 0~180°. Therefore, to obtain a more accurate angle, the result needs to be compensated by the cross product of the vectors.

$$\cos^{-1}\left(\frac{\vec{A}\cdot\vec{B}}{|\vec{A}||\vec{B}|}\right)=\theta \qquad \text{Equation (4)}$$

The angle measurement module 910 is capable of applying the cross product to the quaternion vectors of the first display 410 and the second display 420, as in Equation (5).

$$\left|\vec{A}\times\vec{B}\right|=|\vec{A}||\vec{B}|\sin\theta \qquad \text{Equation (5)}$$

The angle measurement module 910 is capable of obtaining an angle between the first display 410 and the second display 420, using Equation (6). That is, since the angle measurement module 910 obtains an angle of 0~180° through the dot product of the quaternion vectors, when the angle measurement module 910 further applies the cross product to the quaternion vectors, the angle measurement module 910 is capable of accurately measuring an angle of 0~360° between the first display 410 and the second display 420 through the cross product.

$$\sin^{-1}\left(\frac{|\vec{A}\times\vec{B}|}{|\vec{A}||\vec{B}|}\right)=\theta \qquad \text{Equation (6)}$$

The angle measurement module 910 is capable of applying a compensation value to the measured angle, by using quaternion vectors, and thus measuring an angle between the first display 410 and the second display 420.

The angle measurement module 910 is capable of obtaining quaternion vectors, using the sensors 715 and 725. The quaternion vectors are theoretical numerical expressions and, thus, may have errors when they are implemented in a real system. This is due to the inherent inaccuracy of a sensor itself, noises due to external factors, etc. In order to reduce possible errors, the angle measurement module 910 is capable of employing a compensation value. That is, under a condition of less than or equal to a preset angle (e.g., 10°), an angle measured by an acceleration sensor is more accurate than an angle measured using quaternion data. Therefore, the difference between the two measured angles may be set to a compensation value.

The angle measurement module 910 is capable of comparing an angle measured by an acceleration sensor with an angle measured using quaternion data, and storing the difference as a compensation value. When both of an angle between the first display 410 and the ground and an angle between the second display 420 and the ground are greater than a preset angle, the angle measurement module 910 is capable of applying the compensation value to an angle measured using quaternion vector, thereby obtaining a final angle.

The angle application module 920 of the electronic device 400 uses an angle measured by the angle measurement module 910 of the electronic device 400.

When the electronic device 400 is in a closed state, the angle application module 920 is capable of loading an illuminance table corresponding to the closed state. For example, when the electronic device 400 is in a closed state, the illuminance sensor 450 may measure an illuminance value which differs from that when the electronic device 400 is in an open state, because the hole 440 is shaded or otherwise covered. Therefore, the electronic device 400 is capable of loading an illuminance table for a closed state, considering factors (conditions) influencing illuminance values measured by the illuminance sensor 450.

The angle application module 920 is capable of controlling the brightness of the first display 410 or the third display, using an illuminance table corresponding to a closed state. For example, when a view window is located in the optional area 430, the angle application module 920 is capable of adjusting the brightness of the first display 410. Alternatively, when the third display is located in the optional area 430, the angle application module 920 is capable of adjusting the brightness of the third display.

When the electronic device 400 is in an open state, the angle application module 920 is capable of loading an illuminance table corresponding to the open state. In particular, the angle application module 920 is capable of using illuminance tables which differ from each other, corresponding to angles between the first display 410 and the second display 420, in an open state. For example, when the electronic device 400 is in an open state where the first and second displays 410 and 420 are open at an angle of 180°, the angle application module 920 may employ a conventional illuminance table because the illuminance sensor 450 is not covered. However, when the electronic device 400 has an angle between the first display 410 and the second display 420 which may affect the measurement of illuminance by the illuminance sensor 450, the angle application module 920 may employ an illuminance table corresponding to the angle.

The angle application module 920 is capable of controlling the brightness of the first and second displays 410 and 420, using an illuminance table corresponding to an open state. In particular, the angle application module 920 is capable of controlling the brightness of the first display 410 and the second display 420, using an illuminance table corresponding to an angle between the first display 410 and the second display 420 in an open state. It should be understood that the angle application module 920 is also capable of controlling the brightness of the third display in an open state.

The angle application module 920 is capable of adjusting the brightness of the displays based on the measured angle and illuminance, thereby showing a compensation effect (correction effect). In general, the more tightly the cover of the electronic device 400 is closed, the darker the electronic device 400 adjusts the brightness of the displays, considering that it is not being used. However, in a state where a third display is installed to the second housing 1120, although the electronic device 400 obtains a relatively small level of illuminance measured via the illuminance sensor 450, it needs to adjust the brightness of the third display to be bright. Therefore, the angle application module 920 is capable of adjusting the brightness of at least one display installed to the electronic device 400, considering at least one of an angle, an illuminance value, and a rotation direction of the housing of the electronic device 400.

When the angle application module 920 detects the first and second displays 410 and 420 folding within a range of the angle, the electronic device 400 is capable of re-checking the brightness level of a subject to be photographed via the illuminance sensor 450. For example, when the electronic device 400 detects an amount of light via the illuminance sensor 450, it may produce an effect in a photograph, which differs from an effect created from the amount of light measured via the camera module 460. In general, the electronic device 400 measures its ambient brightness, using the camera module 460, during photographing. However, when the electronic device 400 measures its ambient brightness, using an illuminance sensor 450, instead of the camera module 460, it may obtain an amount of light that differs from that measured by the camera module 460. Therefore, the photographs taken by using the illuminance sensor 450 and the camera module 460 may show different effects from each other.

When the electronic device 400 is positioned in a standing state with the first and second displays 410 and 420 forming a predetermined angle (e.g., 90~120°) and does not experience movement, the angle application module 920 is capable of executing a photo slide show function. For example, when a photo slide show function is executed, the angle application module 920 is capable of maintaining the brightness of the displays at a certain level, regardless of the level of external brightness measured by the illuminance sensor 450.

Figure 10:
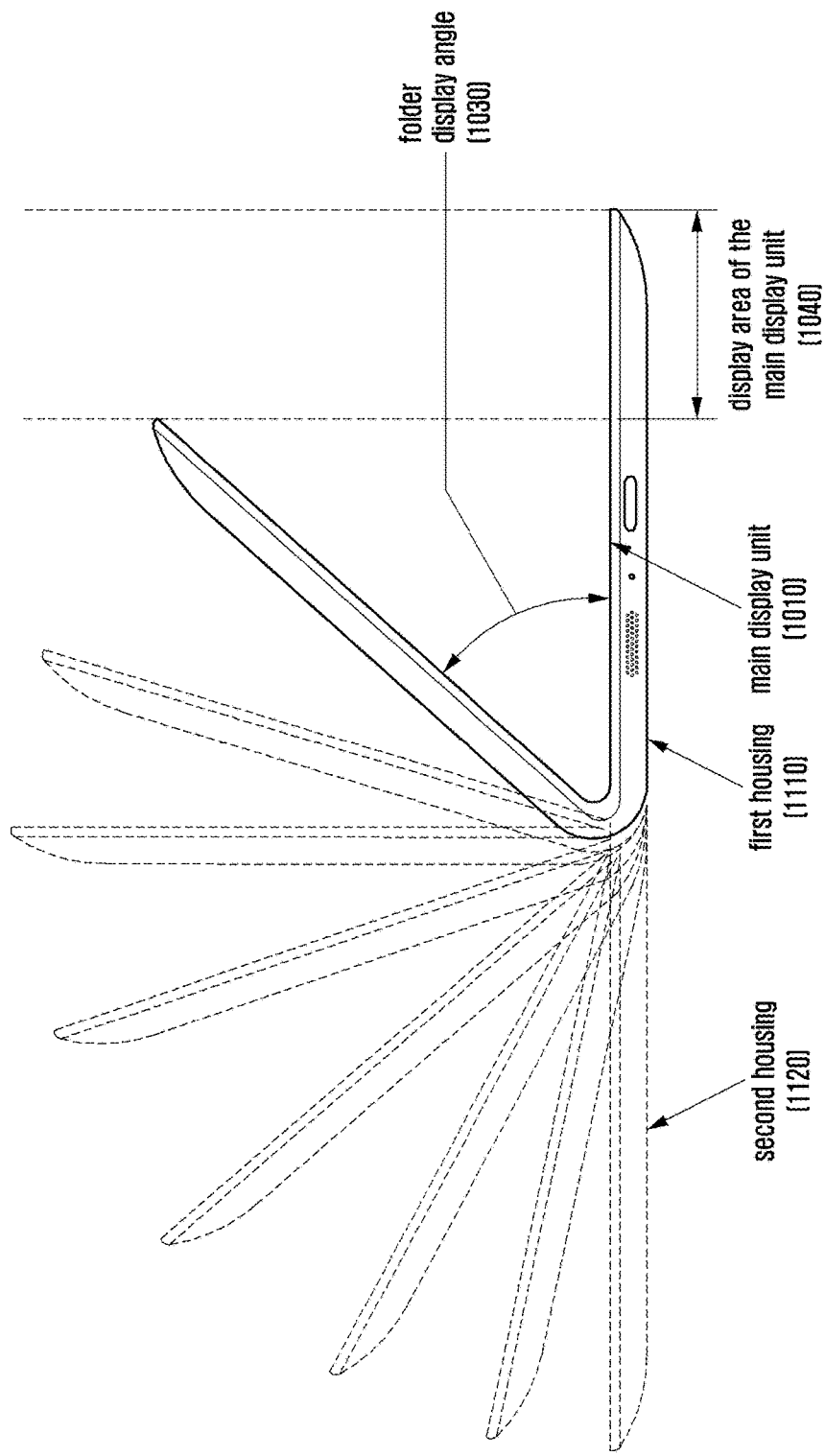
FIG. 10 illustrates a method of adjusting a display area of a main display unit, based on an angle between the main display unit and a folder display unit of an electronic device, according to an embodiment of the present disclosure.

FIG. 10 illustrates a method of adjusting a display area of a main display unit, based on an angle between the main display unit and a folder display unit of an electronic device, according to an embodiment of the present disclosure.

Referring to FIG. 10, the electronic device 400 is provided. As shown in FIG. 10, the first housing 1110 and the second housing 1120 are connected to each other forming a single foldable housing. The first housing 1110 includes a main display unit 1010 and a second housing 1120 includes a folder display unit.

The electronic device 400 is capable of adjusting a display area of the main display unit 1010 according to an angle between the first housing 1110 and the second housing 1120. For example, when the angle between the first housing 1110 and the second housing 1120 is a folder display angle 1030, the electronic device 400 is capable of turning on only the display area 1040 of the main display unit 1010 which is visible based on the angle. That is, the electronic device 400 is capable of detecting and turning off the display area of the main display unit 1010 that the user cannot view based on the angle between the first housing 1110 and the second housing 1120, thereby reducing power consumption.

Figure 11:
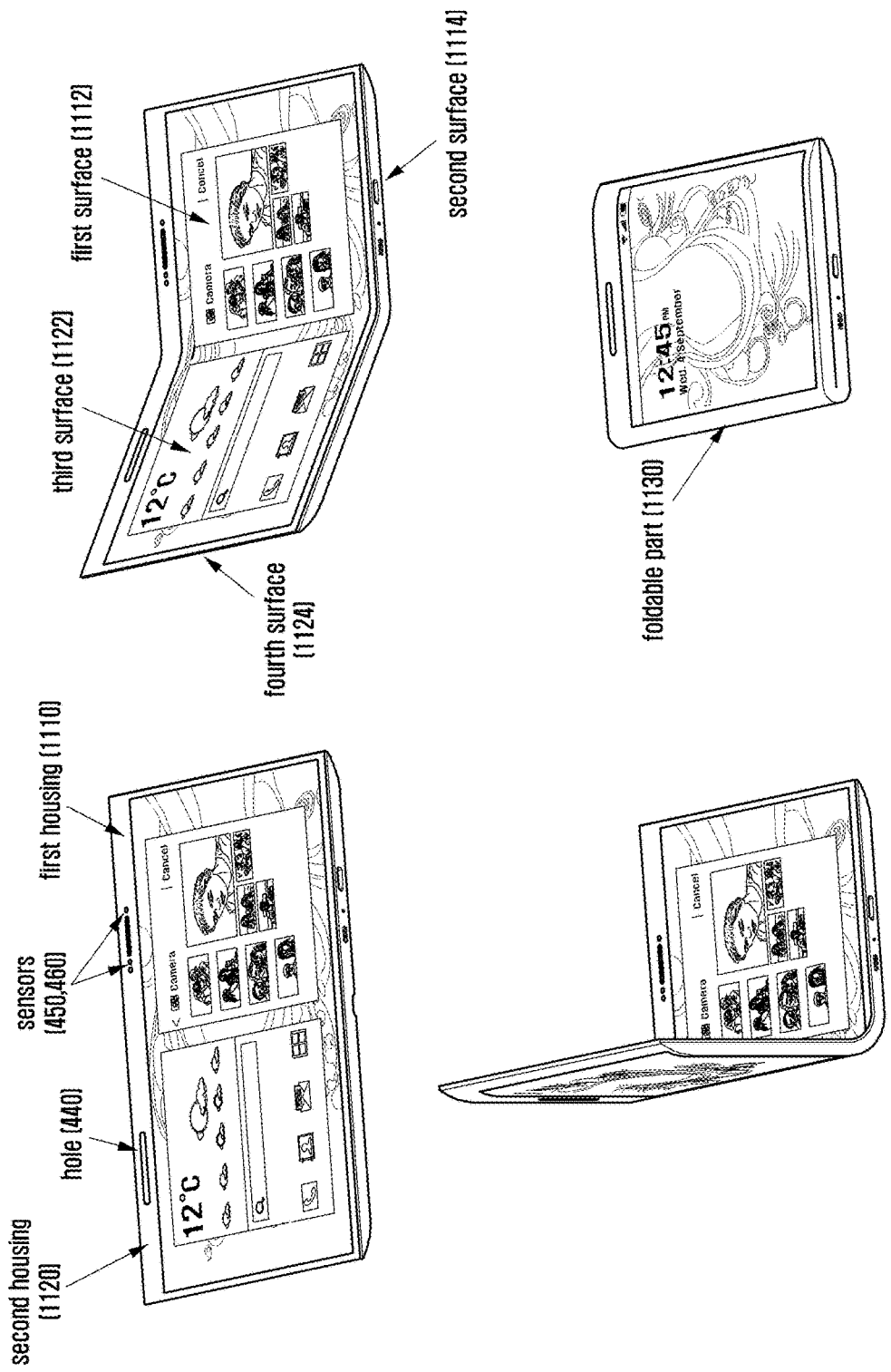
FIG. 11 illustrates external appearances of an electronic device varying according to an angle between displays of the electronic device, according to an embodiment of the present disclosure.

FIG. 11 illustrates external appearances of an electronic device varying according to an angle between displays of the electronic device, according to an embodiment of the present disclosure.

Referring to FIG. 11, the electronic device 400 is shown in various states. The electronic device 400 includes the first housing 1110, the second housing 1120, and a foldable part 1130 connecting the first and second housings 1110 and 1120. The front side of the first housing 1110 is defined as a first surface 1112, and the back side of the first housing 1110 is defined as a second surface 1114. The front side of the second housing 1120 is defined as a third surface 1122 and the back side of the second housing 1120 is defined as a fourth surface 1124.

The first housing 1110 of the electronic device 400 includes the illuminance sensor 450 and the camera module 460 and the second housing 1120 includes the hole 440. Thus, even when the electronic device 400 is in a closed state, it is capable of measuring its ambient illuminance, using the illuminance sensor 450 and the camera module 460 through the hole 440.

Figure 12:
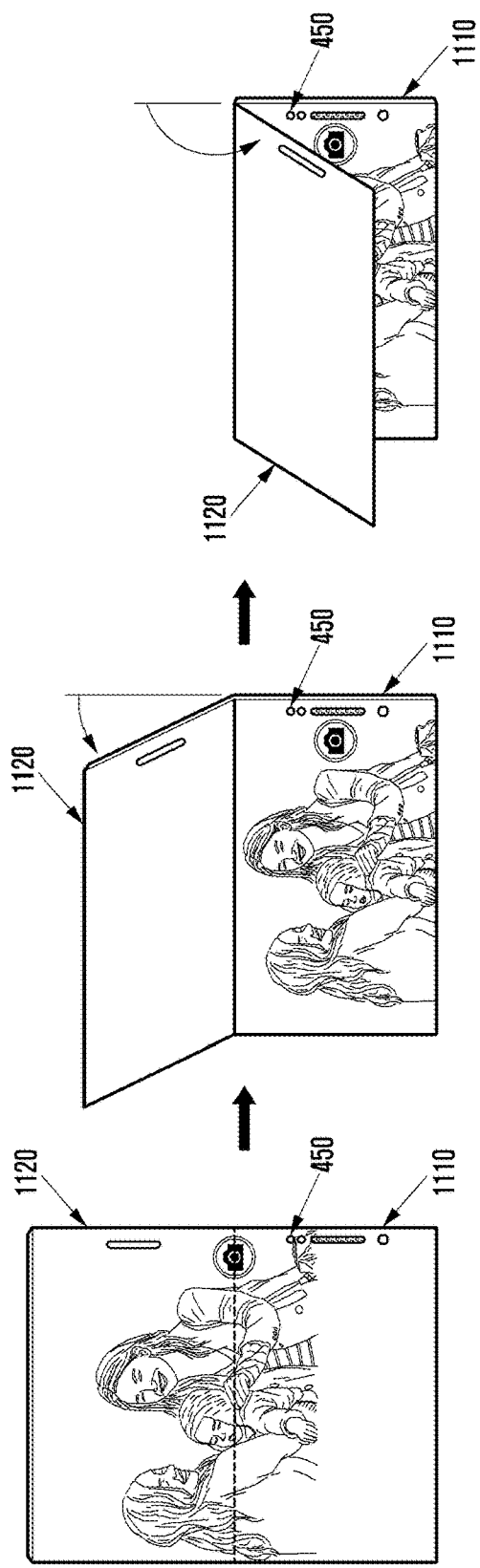
FIG. 12 illustrates a method of measuring illuminance via an illuminance sensor when displays of an electronic device are folded with respect to each other during photographing, according to an embodiment of the present disclosure.

FIG. 12 illustrates a method of measuring illuminance via an illuminance sensor when displays of an electronic device are folded with respect to each other during photographing, according to an embodiment of the present disclosure.

Referring to FIG. 12, the electronic device 400 is shown. When the electronic device 400 detects the first and second displays 410 and 420 folding within a range of angle, the electronic device 400 is capable of re-checking the brightness level of a subject to be photographed via the illuminance sensor 450. For example, when the electronic device 400 detects an amount of light via the illuminance sensor 450, it may produce an effect in a photograph, which differs from an effect created from the amount of light measured via a camera module 460. In general, the electronic device measures its ambient brightness, using the camera module 460, during photographing. However, when the electronic device 400 measures its ambient brightness, using an illuminance sensor 450, instead of the camera module 460, it may obtain an amount of light that differs from that measured by the camera module 460. Therefore, the photographs taken by using the illuminance sensor 450 and the camera module 460 may show different effects from each other.

Figure 13:
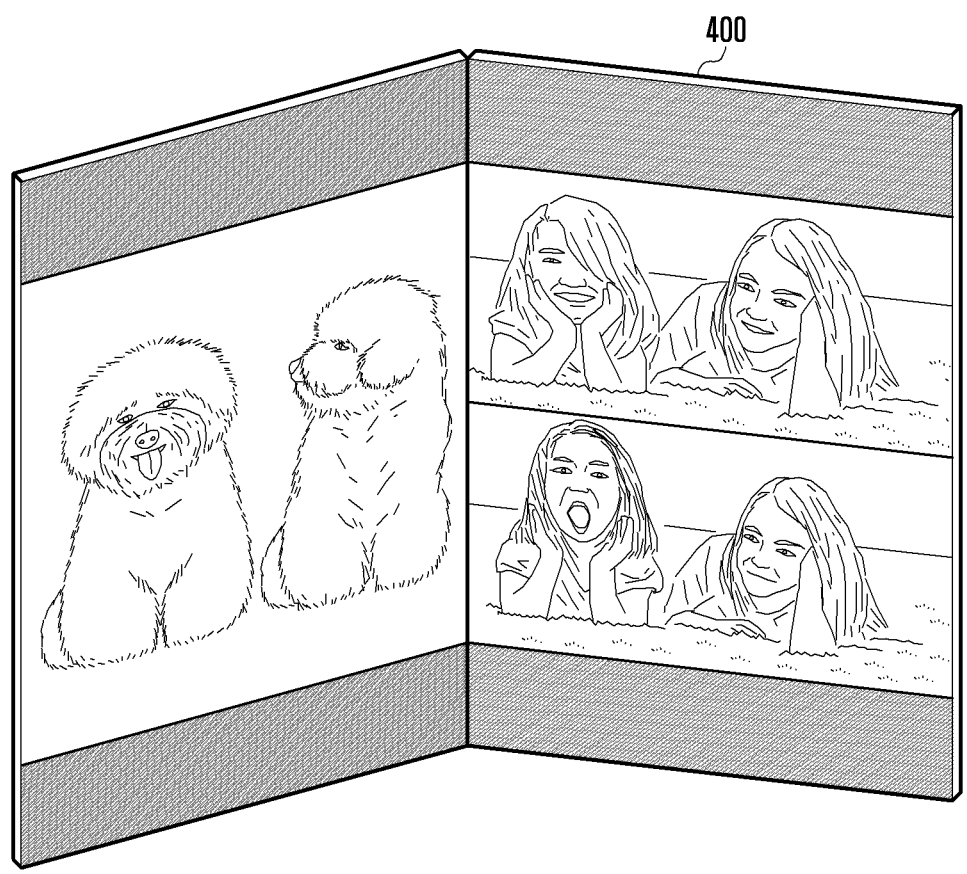
FIG. 13 illustrates a method of executing a photo slide show function, based on an angle between displays of an electronic device, according to an embodiment of the present disclosure.

FIG. 13 illustrates a method of executing a photo slide show function, based on an angle between displays of an electronic device, according to an embodiment of the present disclosure.

Referring to FIG. 13, the electronic device 400 is shown. When the electronic device 400 is positioned in a standing state with the first and second displays 410 and 420 forming a predetermined angle (e.g., 90~120°) and does not experience movement, the electronic device 400 is capable of executing a photo slide show function. For example, when a photo slide show function is executed, the electronic device 400 is capable of maintaining the brightness of the displays to a certain level, regardless of the level of external brightness measured by the illuminance sensor 450.

In various embodiments of the present disclosure, an electronic device is configured to include a foldable housing. The foldable housing includes a first housing including first and second surfaces which face in opposite directions and a second housing including third and fourth faces. The third surface faces the first surface when the second housing is folded in a first direction with respect to the first housing, and the fourth surface faces the second surface when the second housing is folded in a second direction with respect to the first housing. The first housing includes a first display and an illuminance sensor disposed in a periphery area of the first display, on the first surface. The second housing includes a hole formed through which the illuminance sensor is revealed to the outside when the second housing is folded in the first direction.

The second housing includes a second display on the fourth surface, and the fourth surface does not include the illuminance sensor.

The electronic device further includes a processor within the housing; and a memory electrically connected to the processor. The memory stores instructions that enable the processor to control the illuminance sensor to detect illuminance when the second housing is folded in the first direction; and adjust the brightness of the second display, based on at least part of signals from the illuminance sensor.

The second housing includes a third display on the third surface.

The electronic device further includes a first sensor disposed in the first housing; and a second sensor disposed in the second housing. The memory stores instructions that enable the processor to measure an angle between the first and second housings, using the first sensor and the second sensor; and execute at least one action based on the measured angle.

The electronic device further includes a third sensor disposed in the first housing; and a fourth sensor disposed in the second housing. The memory stores instructions that enable the processor to: measure an angle between the first and second housings, using the third sensor and the fourth sensor.

The first sensor and the second sensor are acceleration sensors, and the third sensor and the fourth sensors are gyroscope sensors.

The first sensor and the third sensor are integrally configured into a single body and disposed in the first housing. The second sensor and the fourth sensor are integrally configured into a single body and disposed in the second housing.

The first sensor is arranged in a periphery area of the first display, and the second sensor is arranged in a periphery area of the second display.

The instructions enable the processor to measure a first angle between the first housing and the ground; measure a second angle between the second housing and the ground; determine whether the first angle and/or the second angle is less than or equal to a preset angle; and detect an angle between the first housing and the second housing, based on the determination.

The instructions enable the processor to ascertain that the first angle and/or the second angle is less than or equal to a preset angle; and detect an angle between the first housing and the second housing, using data obtained from the acceleration sensor.

The instructions enable the processor to ascertain that the first angle and the second angle are greater than a preset angle; and detect an angle between the first housing and the second housing, using quaternion vectors.

The instructions enable the processor to obtain a first quaternion vector of the first housing, using data obtained from the first sensor and the third sensor; obtain a second quaternion vector of the second housing, using data obtained from the second sensor and the fourth sensor; and detect an angle between the first housing and the second housing, using quaternion vectors.

The instructions enable the processor to calculate the dot product and the cross product of the first quaternion vector and the second quaternion vector; and detect an angle between the first housing and the second housing, based on the result values of the dot product and the cross product.

The instructions enable the processor to load an illuminance table corresponding to the detected angle; and execute at least one action.

The memory stores instructions enabling the processor to adjust the brightness of the first display and/or the second display, based on at least part of signals from the illuminance sensor and/or the illuminance table.

The illuminance table stores levels of brightness of the first display and/or the second display corresponding to signals from the illuminance sensor.

Various embodiments of the present disclosure provide a housing for electronic devices which is configured to include two or more screens and one illuminance sensor and a method of measuring brightness of two or more screens using the illuminance sensor. Various embodiments of the present disclosure provide a method of measuring an angle between two or more screens and controlling the brightness of two or more screens, based on the measured angle While the present disclosure has been described in detail above with reference to various embodiments, it should be understood by those skilled in the art, that many variations and modifications of the basic inventive concept described herein will still fall within the spirit and scope of the present disclosure, which is defined, not by the detailed description and embodiments, but by the appended claims and their equivalents.

What is claimed is:

1. An electronic device comprising:
a foldable housing comprising:
a first housing including a first display and an illuminance sensor on a front surface; and
a second housing, adjacent to the first housing, including a hole formed through a front surface and a rear surface of the second housing; and
a processor configured to:
measure an angle between the first and second housings; and
adjust a brightness of the first display, based on at least part of signals from the illuminance sensor and an illuminance table corresponding to the measured angle,
wherein the front surface of the first housing faces the front surface of the second housing when the second housing is folded in a first direction with respect to the first housing, and
a rear surface of the first housing faces the rear surface of the second housing when the second housing is folded in a second direction with respect to the first housing.

2. The electronic device of claim 1, wherein:
the second housing includes a second display on the front surface; and
the first housing does not include an illuminance sensor on the rear surface.

3. The electronic device of claim 2, wherein the processor is configured to:
control the illuminance sensor to detect illuminance when the second housing is folded in the first direction; and
adjust the brightness of the second display, based on the at least part of the signals from the illuminance sensor.

4. The electronic device of claim 2, wherein the second housing includes a third display on the rear surface.

5. The electronic device of claim 3, further comprising:
a first sensor disposed in the first housing; and
a second sensor disposed in the second housing,
wherein the processor is configured to:
measure the angle between the first and second housings, using the first sensor and the second sensor; and
execute at least one action based on the measured angle.

6. The electronic device of claim 5, further comprising:
a third sensor disposed in the first housing; and
a fourth sensor disposed in the second housing,
wherein the processor is configured to:
measure the angle between the first and second housings, using the third sensor and the fourth sensor.

7. The electronic device of claim 6, wherein:
the first sensor and the second sensor are acceleration sensors; and
the third sensor and the fourth sensors are gyroscope sensors.

8. The electronic device of claim 7, wherein:
the first sensor and the third sensor are integrally configured into a single body and disposed in the first housing; and
the second sensor and the fourth sensor are integrally configured into a single body and disposed in the second housing.

9. The electronic device of claim 5, wherein:
the first sensor is arranged in a periphery area of the first display; and
the second sensor is arranged in a periphery area of the second display.

10. The electronic device of claim 7, wherein the processor is configured to:
measure a first angle between the first housing and a ground;
measure a second angle between the second housing and the ground;
determine whether at least one of the first angle and the second angle is less than or equal to a preset angle; and
detect the angle between the first housing and the second housing, based on the determination.

11. The electronic device of claim 10, wherein the processor is configured to:
ascertain that at least one of the first angle and the second angle is less than or equal to the preset angle; and
detect the angle between the first housing and the second housing, using data obtained from the acceleration sensor.

12. The electronic device of claim 10, wherein the processor is configured to:
ascertain that at least one of the first angle and the second angle are greater than the preset angle; and
detect the angle between the first housing and the second housing, using quaternion vectors.

13. The electronic device of claim 12, wherein the processor is configured to:
obtain a first quaternion vector of the first housing, using data obtained from the first sensor and the third sensor;
obtain a second quaternion vector of the second housing, using data obtained from the second sensor and the fourth sensor; and
detect the angle between the first housing and the second housing, using the first and second quaternion vectors.

14. The electronic device of claim 13, wherein the processor is configured to:

calculate a dot product and a cross product of the first quaternion vector and the second quaternion vector; and detect the angle between the first housing and the second housing, based on result values of the dot product and the cross product.

15. The electronic device of claim 1, wherein the illuminance table stores levels of brightness of the first display and the second display corresponding to the signals from the illuminance sensor.

* * * * *